US011390180B2

(12) United States Patent
Kim et al.

(10) Patent No.: US 11,390,180 B2
(45) Date of Patent: Jul. 19, 2022

(54) AUTOMATIC HANDLE DEVICE

(71) Applicant: MODERNTEC CO., LTD., Gyeongsangnam-do (KR)

(72) Inventors: Seong Doo Kim, Gyeongsangnam-do (KR); Bo Bae Kim, Gyeongsangnam-do (KR); Joo Wan Kim, Gyeongsangnam-do (KR); Hyung Jun Kim, Gyeongsangnam-do (KR); Hyun Soo Park, Gyeongsangnam-do (KR); Dong Ki Seo, Gyeongsangnam-do (KR); Se Myeong Shin, Gyeongsangnam-do (KR); Seung Hyeon Jeong, Gyeongsangnam-do (KR)

(73) Assignee: MODERNTEC CO., LTD., Gyeongsangnam-do (KR)

( * ) Notice: Subject to any disclaimer, the term of this patent is extended or adjusted under 35 U.S.C. 154(b) by 97 days.

(21) Appl. No.: 16/962,655

(22) PCT Filed: Aug. 14, 2018

(86) PCT No.: PCT/KR2018/009336
§ 371 (c)(1),
(2) Date: Jul. 16, 2020

(87) PCT Pub. No.: WO2019/172494
PCT Pub. Date: Sep. 12, 2019

(65) Prior Publication Data
US 2020/0353833 A1    Nov. 12, 2020

(30) Foreign Application Priority Data
Mar. 8, 2018 (KR) .................. 10-2018-0027641

(51) Int. Cl.
*H02J 7/00* (2006.01)
*H02J 7/14* (2006.01)
(Continued)

(52) U.S. Cl.
CPC ............. *B60L 53/37* (2019.02); *B60L 53/18* (2019.02); *B60L 53/31* (2019.02); *B60L 53/50* (2019.02);
(Continued)

(58) Field of Classification Search
USPC ........................................................ 320/109
See application file for complete search history.

(56) References Cited

U.S. PATENT DOCUMENTS 5,306,999 A * 4/1994 Hoffman ................. B60L 53/31
320/109
5,821,731 A * 10/1998 Kuki ....................... B60L 53/31
320/108
(Continued)

FOREIGN PATENT DOCUMENTS

JP    2012-196093 A    10/2012
KR   10-1075944 B1    10/2011
(Continued)

OTHER PUBLICATIONS

International Search Report for PCT/KR2018/009336 dated Dec. 6, 2018.

*Primary Examiner* — Alexis B Pacheco
(74) *Attorney, Agent, or Firm* — The PL Law Group, PLLC (57) ABSTRACT

An automatic handle device according to an embodiment of the present invention includes a grabbing part for grabbing a charging gun to be attached/detached to/from an electric vehicle, and an aligning part for moving the grabbing part. The charging gun may be electrically connected to a power module for providing charging power to the electric vehicle and may be held in a holder of a kiosk facing the electric vehicle. The aligning part can align the grabbing part at a first position facing the holder or align the grabbing part at a second position facing a connector of the electric vehicle.

6 Claims, 5 Drawing Sheets

(51) Int. Cl.
  *B60L 53/37* (2019.01)
  *B60L 53/67* (2019.01)
  *B60L 53/50* (2019.01)
  *B60L 53/62* (2019.01)
  *B60L 53/31* (2019.01)
  *B60L 53/18* (2019.01)

(52) U.S. Cl.
  CPC ............... *B60L 53/62* (2019.02); *B60L 53/67* (2019.02); *H02J 7/0045* (2013.01)

(56) References Cited

U.S. PATENT DOCUMENTS

| | | | | |
|---|---|---|---|---|
| 6,157,162 A | * | 12/2000 | Hayashi | H02J 7/0013 320/104 |
| 6,237,647 B1 | * | 5/2001 | Pong | B67D 7/0401 141/231 |
| 7,999,506 B1 | * | 8/2011 | Hollar | B60L 53/35 320/104 |
| 9,056,555 B1 | * | 6/2015 | Zhou | B60L 53/35 |
| 10,562,432 B2 | * | 2/2020 | Chelian | B25J 11/008 |
| 10,576,833 B2 | * | 3/2020 | Malek | B60L 53/16 |
| 10,906,419 B2 | * | 2/2021 | Kwa | H02J 7/0042 |
| 2014/0354229 A1 | * | 12/2014 | Zhao | B60L 53/68 320/109 |
| 2015/0042278 A1 | * | 2/2015 | Leary | B60L 53/31 320/109 |
| 2017/0252922 A1 | * | 9/2017 | Levine | G06N 3/08 |
| 2018/0215043 A1 | * | 8/2018 | Michalakis | B60S 3/04 |
| 2020/0023743 A1 | * | 1/2020 | Chang | B60L 53/30 |
| 2020/0130188 A1 | * | 4/2020 | Lawrence | B25J 5/02 |
| 2020/0369167 A1 | * | 11/2020 | Krucinski | B60L 53/305 |

FOREIGN PATENT DOCUMENTS

| | | |
|---|---|---|
| KR | 10-2013-0070976 A | 6/2013 |
| KR | 10-2017-0035212 A | 3/2017 |
| KR | 10-1792792 B1 | 11/2017 |

* cited by examiner

AUTOMATIC HANDLE DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/009336, filed Aug. 14, 2018, which claims priority to the benefit of Korean Patent Application No. 10-2018-0027641 filed in the Korean Intellectual Property Office on Mar. 8, 2018, the entire contents of which are incorporated herein by reference.

TECHNICAL FIELD

The present invention relates to an automatic handle device, by which a charging gun is automatically attached/detached to/from a connector of an electric car.

BACKGROUND ART

An electric vehicle (EV) is provided with an EV battery, and a battery management system (BMS) is provided as a battery control system.

Currently, as a part of the development of green technology, much research has been conducted on charging systems for electric vehicles as well as electric vehicles in order to improve the utility of electric vehicles. However, technical problems are not solved yet in the development stage, and as well, charging systems suitable for various consumer needs have not yet been popularized.

SUMMARY

An objective of the present invention is to provide an automatic handle device, by which a charging gun provided in an end of a charging cable is automatically attached/detached to/from an electric car.

An automatic handle device according to the present invention includes a grabbing part for grabbing a charging gun to be attached/detached to/from an electric vehicle; and an aligning part for moving the grabbing part, wherein the charging gun is electrically connected to a power module for providing charging power to the electric vehicle and is held in a holder of a kiosk facing the electric vehicle; and the aligning part aligns the grabbing part at a first position facing the holder or aligns the grabbing part at a second position facing a connector of the electric vehicle.

The automatic handle device according to the present invention may include a grabbing part that automatically picks up the charging gun held in the kiosk and connects the same to the electric vehicle.

The grabbing part can reciprocate across kiosks and electric vehicles by an alignment portion.

The grabbing part can selectively pick up an appropriate charging gun while reciprocating across a plurality of kiosks by the transfer part to connect the same to the electric vehicle.

According to the automatic handle device of the present invention, since the cable is automatically connected to the electric vehicle, the user does not need to pick up the cable directly and connect the same to the electric vehicle. Therefore, it is possible to improve charging convenience, and to prevent an electric shock accident caused by the cable.

DETAILED DESCRIPTION

Figure 1:
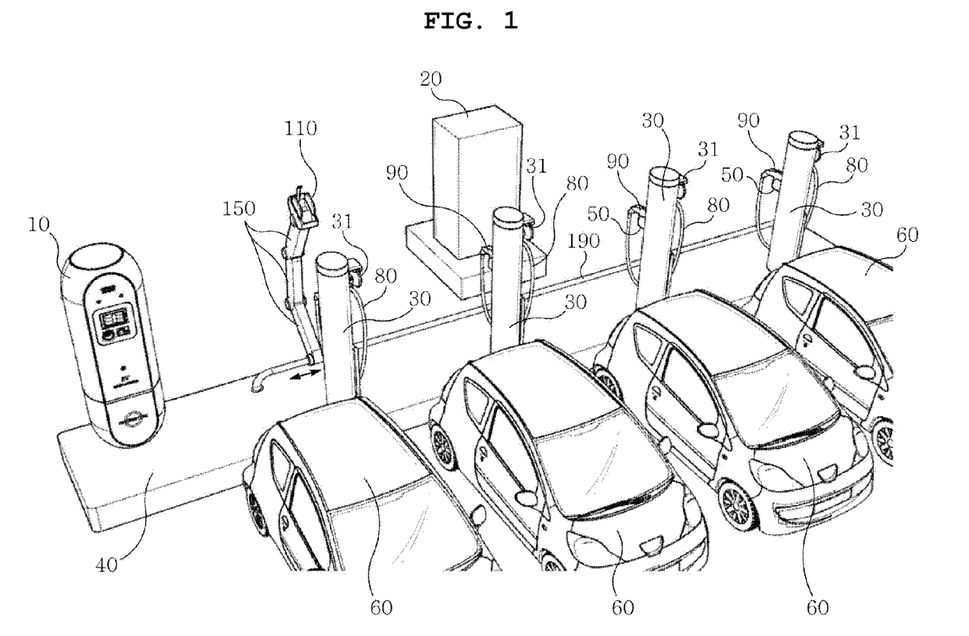
FIG. 1 is a schematic view showing an automatic handle device according to the present invention.

FIG. 1 is a schematic view showing an automatic handle device according to the present invention.

The automatic handle device illustrated in FIG. 1 may include a grabbing part 110, an aligning part 150, and a transfer part 130.

The grabbing part 110 may be formed in such a manner as to grab a charging gun 90 that is electrically attached/detached to/from a connector 61 provided in the electric vehicle 60.

A power module providing charging power capable of charging the battery of the electric vehicle 60 may be provided.

The power module may be installed in a kiosk 30 which is a three-dimensional structure installed at a position facing the electric vehicle 60, or in a main means 20 provided separately from the kiosk 30. When the power module is installed in the main means 20, the expansion and maintenance of the kiosk 30 may be facilitated.

The kiosk 30 may be provided with a cable 80 that is connected to the electric vehicle 60. The kiosk 30 may be electrically connected to the power module through a cable 80, and a plurality of kiosks may be arranged along a predetermined direction. A charging gun 90 connected to the connector 61 of the electric vehicle 60 may be installed at an end of the cable 80. The charging gun 90 may be formed in such a manner as to be gripped by a user's hand or as to be grabbed by the grabbing part 110.

The charging gun 90 may be electrically connected to a power module that provides charging power to the electric vehicle 60. The charging gun 90 may be held in the holder 50 of the kiosk 30 facing the electric vehicle 60.

When a plurality of kiosks 30 are provided, one main indicator 10 that controls each kiosk 30 and displays various menus may be provided. Each kiosk 30 may be provided with a holder 50 in which the charging gun 90 is held. Each kiosk 30 may be provided with a twist-preventing part 31 that prevents the cable 80 from being twisted.

The aligning part 150 may move the grabbing part 110. The aligning part 150 may align the grabbing part 110 at the first position facing the holder 50 or align the grabbing part 110 at the second position facing the connector 61 of the electric vehicle 60. The grabbing part 110 aligned at the first position may hold the charging gun 90 in the holder 50 or pick up the charging gun 90 from the holder 50. The grabbing part 110 aligned at the second position connects the charging gun 90 to the connector 61 of the electric vehicle 60 or disconnects the charging gun 90 connected from the connector 61 of the electric vehicle 60.

The aligning part 150 may have multiple degrees of freedom so that the grabbing part 110 is aligned at the first position and the second position and is reciprocated between the first position and the second position. The aligning part 150 may be formed to have at least three degrees of freedom among six degrees of freedom in a three-dimensional space having three axes (x-axis, y-axis, and z-axis) orthogonal to each other. Specifically, the aligning part 150 may have three or more degrees of freedom among x-axis linear degree of freedom, y-axis linear degree of freedom, z-axis linear degrees of freedom, x-axis rotational degrees of freedom, y-axis rotational degrees of freedom, and z-axis rotational degrees of freedom.

Since the kiosk 30 and holder 50 are in a fixed state, the first position facing the holder 50 may also be fixed. Therefore, the alignment of the grabbing part 110 with respect to the first position may proceed easily. Meanwhile, the second position may be changed. This is because the parking position of the electric vehicle 60 is always changed with respect to the holder 50. Even when a parking guideline for guiding parking of the electric vehicle 60 is provided on the floor surface facing the kiosk 30, the parking position of the electric vehicle 60 may be always changed.

Therefore, a sensing means for determining the position of the connector 61 of the electric vehicle 60 may be provided. For example, the grabbing part 110 or the aligning part 150 is provided with a photographing part for photographing the connector 61 of the electric vehicle 60, and a determining part for determining the position of the connector 61 of the electric vehicle 60 through analysis of an image captured by the photographing part.

When the position of the connector 61 of the electric vehicle 60 is identified through the photographing part and the determining part, the aligning part 150 uses the position information of the connector 61 identified by the determining part to specify the second position. The aligning part 150 may align the grabbing part 110 at the specified second position.

When a plurality of kiosks 30 are provided, a plurality of charging guns 90 may be provided as grab targets of the grabbing part 110.

The transfer part 130 may transport the grabbing part 110 along the direction in which the plurality of kiosks 30 are arranged so that one grabbing part 110 may process the plurality of charging guns 90. As the transfer 130 allows the grabbing part 110 to move across the plurality of kiosks 30, the grabbing part 110 may selectively pick up one of the plurality of charging guns 90 held at different locations, thereby connecting the same to the electric vehicle 60.

When the plurality of electric vehicles 60 requests the plurality of kiosks 30 to perform charging, the transfer part 130 may assign a charging order to each kiosk 30. The transfer part 130 may transfer the grabbing part 110 according to the charging order assigned to each kiosk 30. The charging order may be determined according to an order in which charging is required through the kiosk 30 or the main indicator 10, for example, an order in which a charging button provided in the kiosk is operated.

As shown in FIG. 1, it is assumed that four electric vehicles 60 make a request to perform charging. It is considered that the vehicles are termed as a first vehicle, a second vehicle, a third vehicle, and a fourth vehicle from left to right.

The charging order may be determined according to the order in which the vehicles make a request to perform charging using the kiosk 30 or the main indicator 10.

For example, when the first vehicle, the second vehicle, the third vehicle, and the fourth vehicle make a request to perform charging in this order, the transfer part 130 may move the grabbing part 110 to the first vehicle, the second vehicle, the third vehicle, and the fourth vehicle, in this order.

For efficient charging, the transfer part 130 may change the charging order, when the setting condition is satisfied on the basis of the charging order.

The amount of provided power capable of being provided by the power module may be limited to a predetermined value or less. A remaining amount of power of the amount of provided power, except an amount of power to be supplied to the pre-connected vehicle, may be provided to a higher priority vehicle among standby vehicles.

Herein, when an amount of power required by the higher priority vehicle among the standby vehicles is greater than the remaining amount of power, the remaining amount of power may be first provided to a lower priority vehicle. That is, the transfer part 130 may transfer the grabbing part 110 or the aligning part 150 to the kiosk 30 facing the lower priority vehicle instead of the higher priority vehicle among the standby vehicles. The grabbing part 110 may pick up the charging gun 90 held in the kiosk 30 facing the lower priority vehicle and connect the same to the lower priority vehicle.

As an example, the power module may charge the electric vehicle 60 in three charging modes: rapid charging mode, medium speed charging mode, and slow charging mode. The rapid charging mode may be a charging mode in which the electric vehicle 60 is charged at 50 kWh. The medium speed charging mode may be a charging mode in which the electric vehicle 60 is charged at 30 kWh. The slow charging mode may be a charging mode in which the electric vehicle 60 is charged at 7 to 20 kWh.

For example, the power module may have a power amount of 70 kWh. When the first priority vehicle makes a request for rapid charging, the transfer part 130 may transfer the grabbing part 110 to the kiosk 30 facing the first priority vehicle. The grabbing part 110 transferred to the kiosk 30 facing the first priority vehicle may pull out the charging gun 90 held in the kiosk 30 to connect the same to the electric vehicle 60. Due to the rapid charging of the first priority vehicle, the remaining amount of power is 20 kWh. The second priority vehicle may make a request for medium speed charging, and the third priority vehicle may make a request for slow charging. In this case, the remaining amount of power may not satisfy medium speed charging of the second priority vehicle, but satisfy slow charging of the third priority vehicle. Herein, when the charging gun 90 has been already connected to the first priority vehicle, the transfer part 130 may transfer the grabbing part 110 or the aligning part 150 to the kiosk 30 facing the third priority vehicle. The grabbing part 110 transferred to the kiosk 30 facing the third priority vehicle may pull out the charging gun 90 held in the kiosk 30 to connect the same to the third priority vehicle.

After charging of the first priority vehicle is completed or immediately before charging of the first priority vehicle is completed, the transfer part 130 may transfer the grabbing part 110 to the kiosk 30 facing the second priority vehicle. The grabbing part 110 transferred to the corresponding position may pull out the charging gun held in the kiosk 30 to connect the same to the second priority vehicle. When charging of the first priority vehicle is completed, the transfer part 130 may transfer the grabbing part 110 to the first priority vehicle. The grabbing part 110 transferred to the first priority vehicle may pull out the charging gun 90 connected to the first priority vehicle to cause the same to be held in the holder 50 of the kiosk 30 corresponding thereto.

FIGS. 2 to 5 are schematic diagrams showing operations of the automatic handle device.

The grabbing part 110 may include two fasteners 111 for clamping each of one side and the other side of the charging gun 90. As each fastener 111 moves toward each other to cause the distance between each fastener 111 to decrease, it is possible to pick up the charging gun 90 disposed between the two fasteners. An anti-rotation unit 113 that prevents the vertical rotation of the charging gun 90 between the fasteners 111 may be provided in the upper side of the grabbing part 110.

The transfer part 130 may move along a rail 190 extending in the arrangement direction of the kiosk 30. As an example, the rail 190 may include a pipe extending in the arrangement direction of the kiosk 30. The rail 190 may be formed on the ground or may be formed on the base structure 40 installed on the ground.

When the aligning part 150 or the grabbing part 110 collides with the electric vehicle 60 as the transfer part 130 moves along the rail 190, the electric vehicle 60 or the like may be damaged. To prevent such damage in the electric vehicle 60 and the grabbing part 110, the transfer part 130 may be disposed in such a manner as to face the electric vehicle 60 with the kiosk 30 in between.

Figure 2:
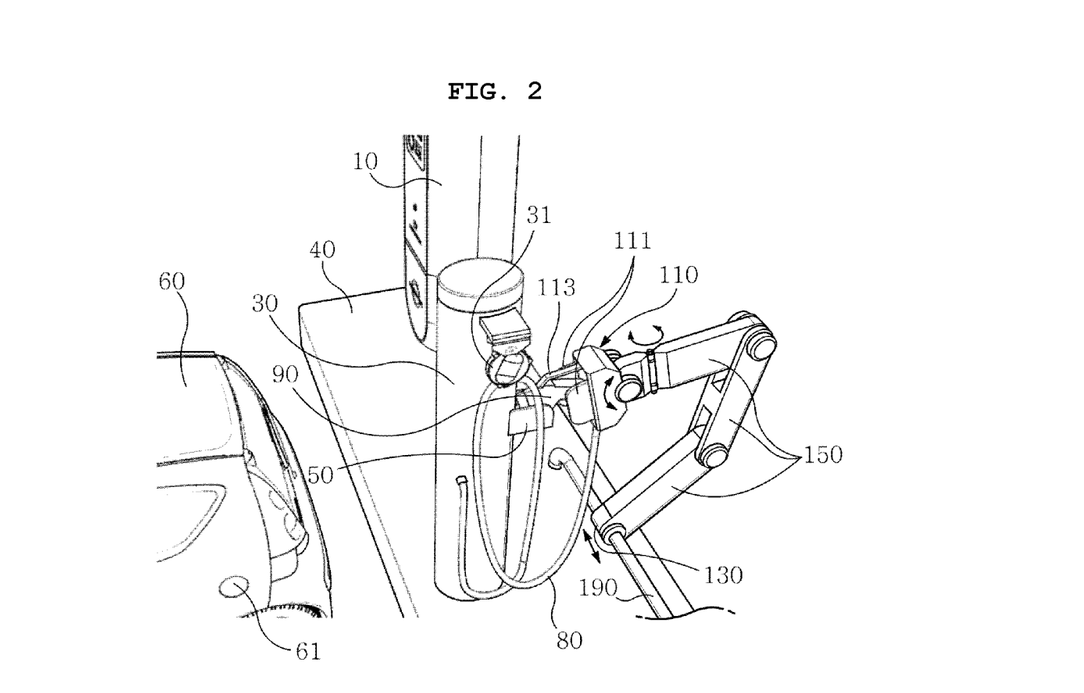
FIGS. 2 to 5 are schematic views showing an operation of the automatic handle device.

As shown in FIG. 2, the transfer part 130 may move the grabbing part 110 to the same position as the holder in the arrangement direction of the kiosk 30. As an example, the transfer part 130 may move the grabbing part 110 to a position facing the holder 50 of the kiosk 30. When the grabbing part 110 is moved to a position facing the holder 50 of the kiosk 30 in the arrangement direction of the kiosk 30, the grabbing part 110 may be aligned at a first position facing the holder 50 by the aligning part 150 connecting the transfer part 130 and the grabbing part 110. As an example, the aligning part 150 may have a plurality of joints that are rotated around a virtual line extending in the arrangement direction of the kiosk 30. Before the grabbing part 110 is aligned at the first position, two fasteners 111 of the grabbing part 110 may move in such a manner as to be separated from each other such that the charging gun 90 is inserted between the two fasteners. When the aligning part 150 causes the grabbing part 110 to be aligned at the first position, the charging gun 90 may be placed between fasteners 111 and then grabbed by the grabbing part 110 due to a grabbing operation that causes the fasteners 111 to move toward each other.

When the charging gun 90 is grabbed by the grabbing part 110, the aligning part 150 may move the grabbing part 110 into a direction in which the charging gun 90 is separated from the holder 50. By such an operation, the charging gun 90 held in the holder 50 may be pulled out of the holder 50.

Figure 3:
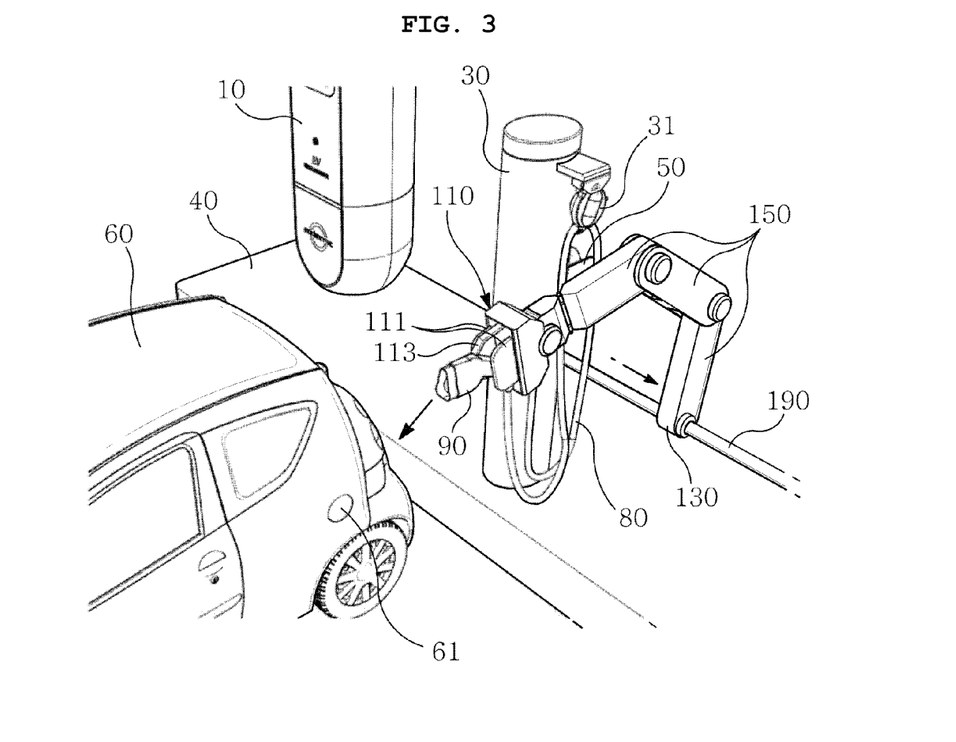

When the charging gun 90 is pulled out of the holder 50, the transfer part 130 may move along the arrangement direction of the kiosk 30 to prevent the kiosk 30 from blocking the electric vehicle 60, as shown in FIG. 3. When the kiosk 30 is prevented from blocking the electric vehicle 60, the aligning part 150 may allow the grabbing part 110 to move toward the second position facing the connector 61 of the electric vehicle 60.

Figure 4:
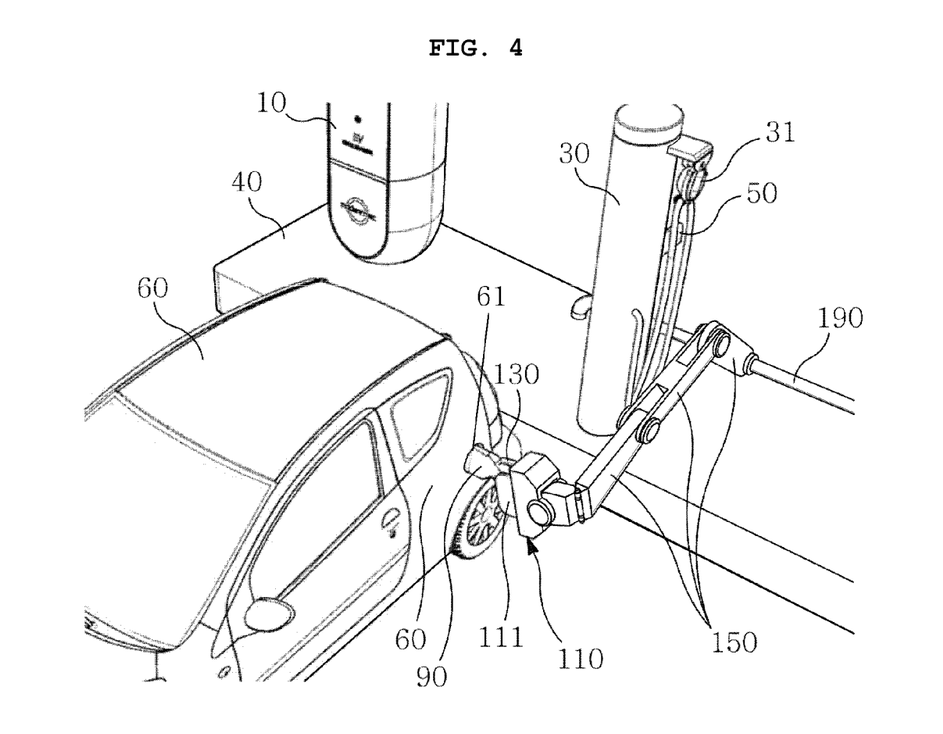

The grabbing part 110 reaching the second position is adjusted in a position according to an angle of the connector 61 of the electric vehicle 60, and then the grabbed charging gun 90 is plugged into the connector 61 of the electric vehicle 60, as shown in FIG. 4.

Figure 5:
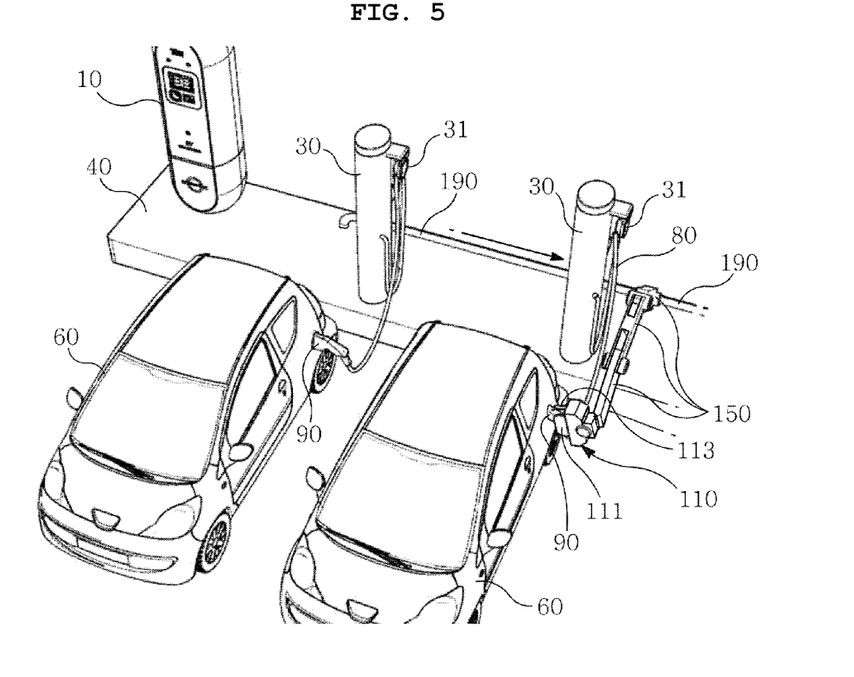

When the connection of the charging gun 90 to a specific electric vehicle 60 is completed, the transfer part 130 may transfer the grabbing part 110 to the holder 50 of the kiosk 30 facing the electric vehicle 60 having the next priority, as shown in FIG. 5. The transfer part 130, the aligning part 150, and the grabbing part 110 may repeat operations described referring to FIGS. 2 to 4, to connect the charging gun 90 to the electric vehicle 60 having the next priority.

When charging of a specific electric vehicle 60 is completed, the transfer part 130 may transfer the grabbing part 110 to a position facing the specific electric vehicle 60. The grabbing part 110 transferred to the corresponding position is moved to the second position for the specific electric vehicle 60 by the aligning part 150, and then grabs and pulls out the charging gun 90 plugged into the specific electric vehicle 60.

When the charging gun 90 is pulled out of the specific electric vehicle 60, the grabbing part 110 may be moved toward the rail 190 so that interference between the aligning part 150 or the grabbing part 110 and the kiosk 30 is avoided. The transfer part 130 transfers the grabbing part 110 moved toward the rail 190 to a position facing the holder 50 of the kiosk 30, and the aligning part 150 may align the grabbing part 110 at the first position for the kiosk 30. A portion of the charging gun 90 may be placed on the holder 50 by the grabbing part 110 aligned at the first position. When the grabbing part 110 releases the grab on the charging gun 90, the charging gun 90 may be held in the holder 50 of the kiosk 30.

According to the automatic handle device described above, the user does not need to manually grab the cable 80 and the charging gun 90 through which electricity flows. Therefore, since it is possible to eliminate the process of inserting/removing the cable 80 into/from the electric vehicle 60 during the charging process of the electric vehicle 60, there is an effect that an electric shock accident due to carelessness can be prevented.

A communication means for used in wireless communication with the kiosk 30 or the main indicator 10 may be provided in the electric vehicle 60 or a portable terminal of a user owning the electric vehicle 60. When the selection of charging mode and the payment are made remotely through the communication means, the user of the electric vehicle 60 can safely process all processes related to the selection of charging mode required for electric vehicle 60, the connection of the charging gun 90, and the payment.

The invention claimed is:

1. An automatic handle device, comprising:
   a grabbing part for grabbing a charging gun to be attached/detached to/from an electric vehicle; and
   an aligning part for moving the grabbing part,
   wherein the charging gun is electrically connected to a power module for providing charging power to the electric vehicle and is held in a holder of a kiosk facing the electric vehicle;
   the aligning part aligns the grabbing part at a first position facing the holder or aligns the grabbing part at a second position facing a connector of the electric vehicle,
   a plurality of kiosks are arranged along a predetermined direction;
   a transfer part is provided to transfer the grabbing part along a direction in which the plurality of kiosks are arranged;
   the grabbing part selectively picks up the plurality of charging guns held at different locations while moving across the plurality of kiosks by the transfer part; and
   the transfer part is disposed at a position facing the electric vehicle with the kiosk in between.

2. The device of claim 1, wherein the grabbing part aligned at the first position holds the charging gun in the holder, or picks up the charging gun from the holder; and
   the grabbing part aligned at the second position connects the charging gun to the connector of the electric vehicle or pulls out the charging gun connected to the connector of the electric vehicle.

3. The device of claim 1, wherein the transfer part assigns, to each kiosk, a charging order determined according to an order in which charging is requested through the kiosk or a main indicator, and transfers the grabbing part according to the charging order assigned to each kiosk.

4. An automatic handle device, comprising:
a grabbing part for grabbing a charging gun to be attached/detached to/from an electric vehicle; and
an aligning part for moving the grabbing part,
wherein the charging gun is electrically connected to a power module for providing charging power to the electric vehicle and is held in a holder of a kiosk facing the electric vehicle;
the aligning part aligns the grabbing part at a first position facing the holder or aligns the grabbing part at a second position facing a connector of the electric vehicle,
a plurality of kiosks are arranged along a predetermined direction;
a transfer part is provided to transfer the grabbing part along a direction in which the plurality of kiosks are arranged;
the grabbing part selectively picks up the plurality of charging guns held at different locations while moving across the plurality of kiosks by the transfer part;
a remaining amount of power except a power to be supplied to a pre-connected vehicle, among an amount of provided power to the power module, is provided to a higher priority vehicle among standby vehicles;
the transfer part transfers the grabbing part or the aligning part to a kiosk facing a lower priority vehicle other than the higher priority vehicle of the standby vehicles, when an amount of power required by the higher priority vehicle is greater than the remaining amount of power; and
the grabbing part picks up the charging gun held in the kiosk facing the lower priority vehicle and connects the same to the lower priority vehicle.

5. An automatic handle device, comprising:
a grabbing part for grabbing a charging gun to be attached/detached to/from an electric vehicle; and
an aligning part for moving the grabbing part,
wherein the charging gun is electrically connected to a power module for providing charging power to the electric vehicle and is held in a holder of a kiosk facing the electric vehicle;
the aligning part aligns the grabbing part at a first position facing the holder or aligns the grabbing part at a second position facing a connector of the electric vehicle,
a plurality of kiosks are arranged along a predetermined direction;
a transfer part is provided to transfer the grabbing part along a direction in which the plurality of kiosks are arranged;
the grabbing part selectively picks up the plurality of charging guns held at different locations while moving across the plurality of kiosks by the transfer part; and
the transfer part is disposed at a position facing the electric vehicle with the kiosk in between,
in which the transfer part moves the grabbing part or the aligning part along the arrangement direction of the plurality of kiosks;
the transfer part moves the grabbing part to a position facing the holder of a specific kiosk along the arrangement direction;
when the grabbing part is moved to a position facing the holder, the grabbing part is aligned at the first position by the aligning part connecting the transfer part and the grabbing part;
when the grabbing part aligned at the first position grabs the charging gun, the transfer part moves along the arrangement direction of the kiosks to prevent a specific kiosk from blocking the electric vehicle; and
when the transfer part prevents the specific kiosk from blocking the electric vehicle, the grabbing part moves toward the second position by the aligning part.

6. The device of claim 1, wherein the grabbing part or the aligning part is provided with a photographing part for photographing the connector of the electric vehicle, and a determining part for identifying a position of the connector of the electric vehicle through analysis of an image captured by the photographing part; and
the aligning part aligns the grabbing part at the second position using the position information of the connector identified by the determining part.

* * * * *